(12) United States Patent
Langfelder et al.

(10) Patent No.: US 12,399,007 B2
(45) Date of Patent: Aug. 26, 2025

(54) 3-AXIS GYROSCOPE WITH IMPROVED PERFORMANCE

(71) Applicants: COMMISSARIAT A L'ENERGIE ATOMIQUE ET AUX ENERGIES ALTERNATIVES, Paris (FR); POLITECNICO DI MILANO, Milan (IT)

(72) Inventors: Giacomo Langfelder, Milan (IT); Marco Gadola, Oleggio (IT)

(73) Assignees: COMMISSARIAT A L'ENERGIE ATOMIQUE ET AUX ENERGIES ALTERNATIVES, Paris (FR); POLITECNICO DI MILANO, Milan (IT)

( * ) Notice: Subject to any disclaimer, the term of this patent is extended or adjusted under 35 U.S.C. 154(b) by 235 days.

(21) Appl. No.: 18/156,639

(22) Filed: Jan. 19, 2023

(65) Prior Publication Data
US 2023/0236013 A1 Jul. 27, 2023

(30) Foreign Application Priority Data
Jan. 25, 2022 (EP) ..................................... 22315019

(51) Int. Cl.
*G01C 19/5705* (2012.01)
(52) U.S. Cl.
CPC ................................ *G01C 19/5705* (2013.01)
(58) Field of Classification Search
None
See application file for complete search history.

(56) References Cited

U.S. PATENT DOCUMENTS

| 6,378,369 B1* | 4/2002 | Takata ............... G01C 19/5719 73/504.12 |
| 9,003,882 B1 | 4/2015 | Ayazi et al. |
| 2010/0218604 A1 | 9/2010 | Terada |
| 2010/0236327 A1* | 9/2010 | Mao .................... G01C 19/5719 73/504.12 |

(Continued)

OTHER PUBLICATIONS

European Extended Search Report and Written Opinion issued Jul. 12, 2022 in European Application 22315019.4, filed on Jan. 25, 2022 citing documents 1-2, 24 therein, 12 pages.

(Continued)

*Primary Examiner* — Laura Martin
*Assistant Examiner* — Mark A Shabman
(74) *Attorney, Agent, or Firm* — Oblon, McClelland, Maier & Neustadt, L.L.P.

(57) ABSTRACT

An inertial sensor including a substrate, a first pair of proof masses sensitive to rotation movements occurring around a first direction and a third direction, a second pair of proof masses sensitive to rotation movements occurring around a second direction and the third direction, an excitation device, four frames, a rotatable frame and a sensing system connected to the rotatable frame. This inertial sensor is characterized in that the excitation device is configured to force the first pair of proof masses and the second pair of proof masses into a motion going towards and away from the sensing system, and wherein the readout of the rotation movements occurring in each of the three directions is achieved with piezoelectric gauges.

12 Claims, 7 Drawing Sheets

(56) References Cited

U.S. PATENT DOCUMENTS

| | | | | |
|---|---|---|---|---|
| 2011/0154898 A1* | 6/2011 | Cazzaniga | ......... | G01C 19/5747 |
| | | | | 73/504.12 |
| 2012/0279300 A1* | 11/2012 | Walther | ............ | G01C 19/5747 |
| | | | | 73/504.03 |
| 2013/0091948 A1* | 4/2013 | Yamamoto | ......... | G01C 19/5733 |
| | | | | 73/504.02 |
| 2015/0285634 A1* | 10/2015 | Watanabe | .......... | G01C 19/5733 |
| | | | | 73/504.12 |
| 2017/0052027 A1* | 2/2017 | Jomori | ............... | G01C 19/5747 |

OTHER PUBLICATIONS

Sonmezoglu, S., et al. "Single-Structure Micromachined Three-Axis Gyroscope With Reduced Drive-Force Coupling" IEEE Electron Device Letters, 2015, vol. 36, No. 9, 4 pages.

Dellea, S., et al. "In-Plane and out-of-plane MEMS gyroscopes based on piezoresistive NEMS detection" Journal of Microelectromechanical Systems, 2015, vol. 24, No. 6, 10 pages.

Dellea, S., et al. "MEMS Gyroscopes Based on Piezoresistive NEMS Detection of Drive and Sense Motion" Journal of Microelectromechanical Systems, 2017, vol. 26, No. 6, 11 pages.

Efimovskaya, A., et al. "Compact Roll-Pitch-Yaw Gyroscope Implemented in Wafer-level Epitaxial Silicon Encapsulation Process" IEEE International Symposium on Inertial Sensors and Systems (Inertial). IEEE, 2017, 2 pages.

\* cited by examiner

3-AXIS GYROSCOPE WITH IMPROVED PERFORMANCE

TECHNICAL FIELD

The present invention relates to inertial sensors, particularly to angular displacement sensors that can be used to detect angular position, speed or acceleration, and more particularly to 3-axis miniaturized high-performance gyroscopes.

PRIOR ART

Rotational movement detection is important in the automotive and aviation sectors as well as satellite navigation systems. Gyroscopes based on microelectromechanical systems can be miniaturized so as to be integrated in smartphones and smart devices.

Such gyroscopes monitor the motion of proof masses fixed to drive frames and to which a periodical vibration has been applied along an excitation direction also called drive excitation direction. This periodical vibration is referred as the drive frame motion.

When the device is subjected to a rotational motion whose central axis is extending along a direction perpendicular to the drive frame motion direction, the proof masses are subjected to a Coriolis acceleration inducing movement along a direction perpendicular to both the direction along the angular rotation vector and the drive excitation direction. This movement is a function of the rotational motion. Hence, by monitoring this movement, it is possible to determine the rotational movement.

Gyroscopes are typically referred as pitch, roll and/or yaw gyroscopes according to along which axis they are measuring the angular velocity. Pitch and roll gyroscopes measure the angular velocity around in-plane directions, while yaw gyroscopes measure the angular velocity around a direction perpendicular to the device plane. A so-called 3-axis gyroscope simultaneously measures the angular velocity around three perpendicular directions.

Monolithic 3-axis gyroscopes formed by a single proof mass and a single driving subsystem and whose readout is achieved through capacitive means are very common in the consumer market because they save area and power consumption. However, this type of 3-axis gyroscope shows high noise levels (e.g. >5 mdps/√Hz) and poor stability performance (e.g. 10-100°/hr). The reason for these defects is that the proof mass footprint is largely occupied by drive comb actuators, drive sense comb detectors, yaw-motion sensing plates and several small holes in the parts moving out-of-plane, to reduce damping and thermomechanical noise. Consequently, for a given footprint, the proof mass value is reduced by the holes needed to accommodate these electrostatic features.

Figure 1:
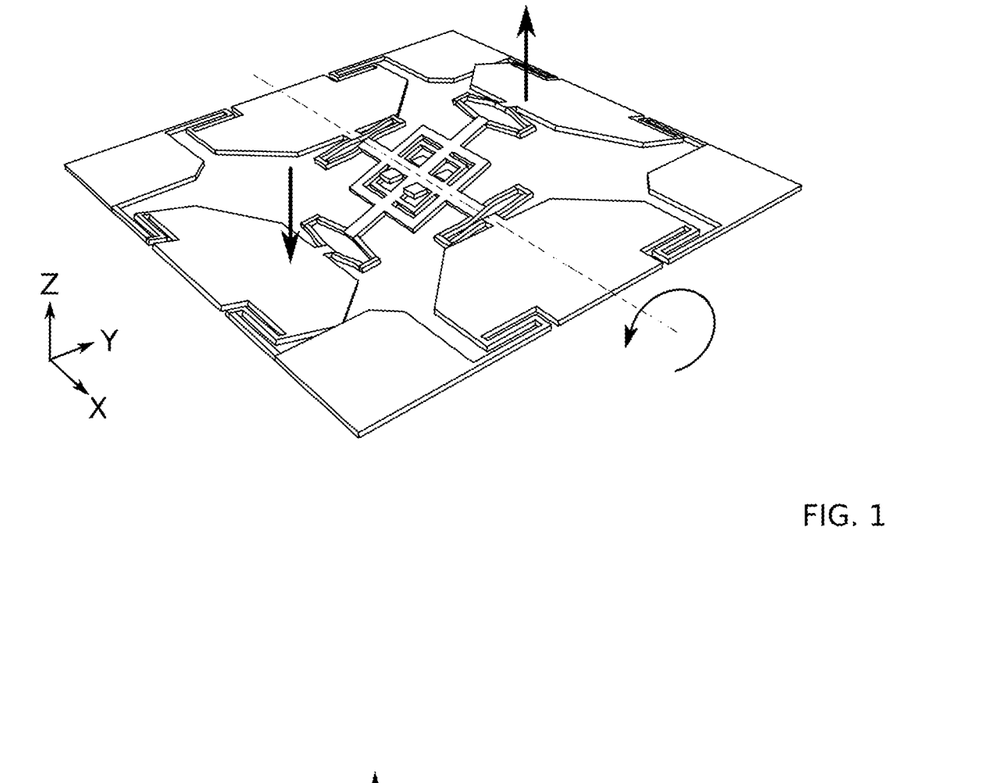
FIGS. 1 to 3 depict a 3-axis inertial sensor gyroscope according to prior art.
Figure 2:
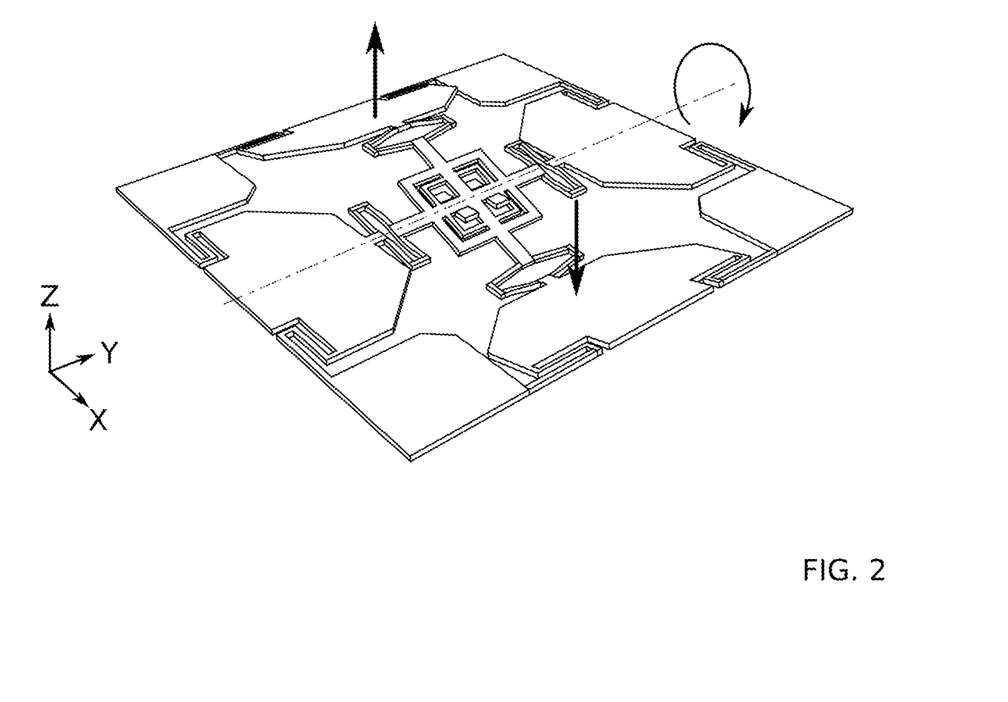
Figure 3:
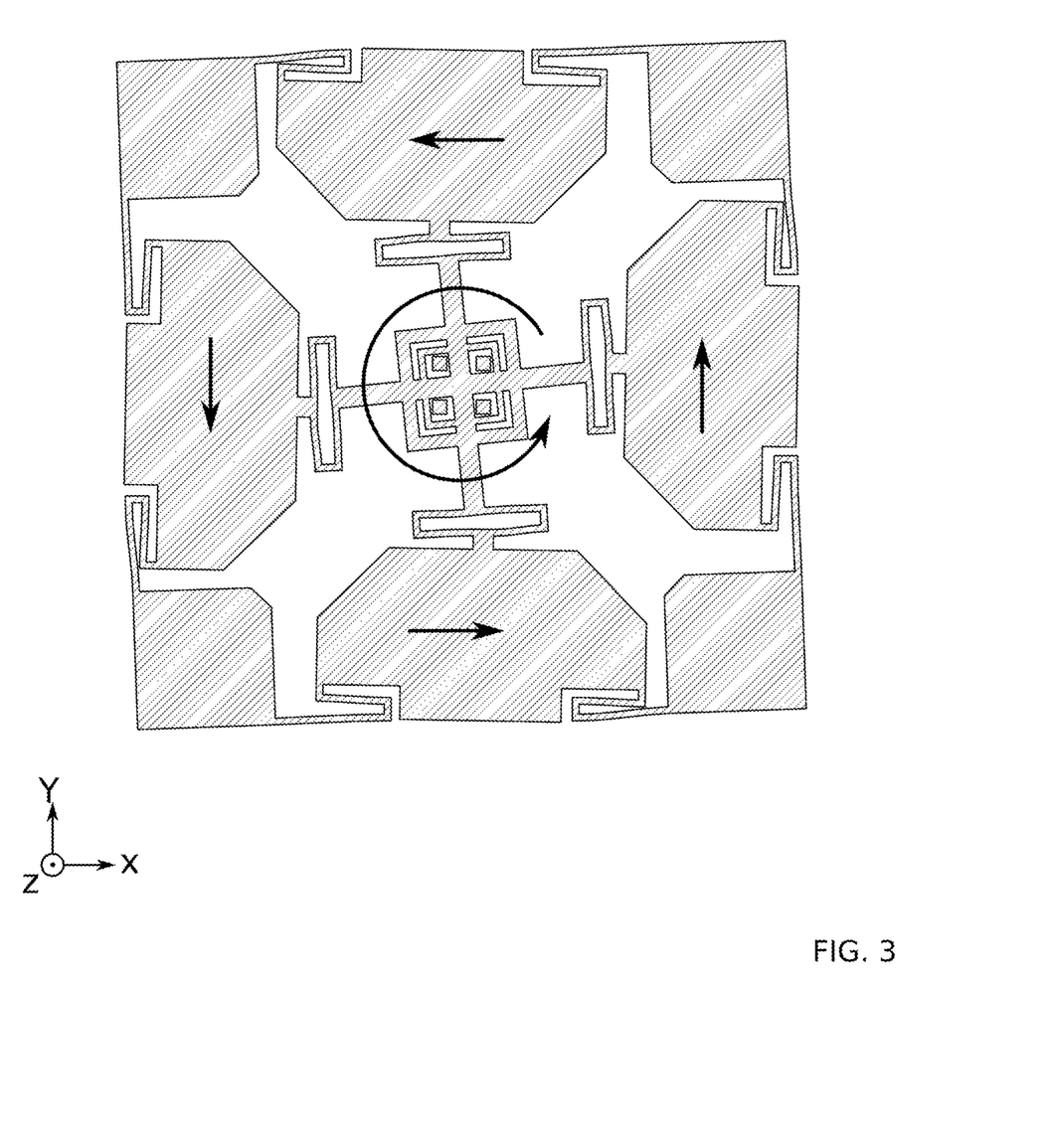

For example, the paper "Single-Structure Micromachined Three-Axis Gyroscope With Reduced Drive-Force Coupling" (Soner Sonmezoglu, Parsa Taheri-Tehrani, Carlo Valzasina, Luca G. Falorni, Sarah Zerbini, Sarah Nitzan, and David A. Horsley, Member, IEEE. IEEE ELECTRON DEVICE LETTERS, VOL. 36, NO. 9, SEPTEMBER 2015) describes a 3-axis monolithic gyroscope with capacitive readout. The sensor disclosed in this publication is depicted in FIGS. 1 to 3. A first pair of proof masses is sensitive to rotational movements occurring around the X axis and the Z axis (FIGS. 1 and 3), and a second pair of proof masses is sensitive to rotational movements occurring around the Y axis and the Z axis (FIGS. 2 and 3). The displacement of these pairs of proof masses in all three directions is measured through capacitive means which aren't represented in FIGS. 1 to 3 for sake of clarity. More specifically, one differential sensing capacitive system is used for each axis. This results in an area and sensitivity trade-off, especially for the Z axis.

A general objective of the present invention is to provide a rationalized and resource-efficient 3-axis monolithic high-performance inertial sensor.

SUMMARY

To at least one of these ends, it is provided an inertial sensor comprising a substrate which defines a device plane extending along a first direction and a second direction, the device plane being perpendicular to a third direction, a first pair of proof masses sensitive to rotation movements occurring around the first direction and the third direction, a second pair of proof masses sensitive to rotation movements occurring around the second direction and the third direction, an excitation device, a first frame, a second frame, a third frame and a fourth frame, a rotatable frame rotatable around the first direction, the second direction and the third direction and a sensing system connected to the rotatable frame.

This inertial sensor is characterized in that the excitation device is configured to force the first pair of proof masses and the second pair of proof masses into a motion going towards and away from the sensing system, the sensing system comprises at least a first pair of piezoelectric gauges monitoring the displacement of the first pair of proof masses and at least a second pair of piezoelectric gauges monitoring the displacement of second pair of proof masses. The sensing system of the excitation part is configured to read out a first voltage value reflecting the motion occurring in the first direction by subtracting the output voltages of the piezoelectric gauges of the first pair of piezoelectric gauges monitoring the displacement of the first pair of proof masses, a second voltage value reflecting the motion occurring in the second direction by subtracting the output voltages of the piezoelectric gauges of the second pair of piezoelectric gauges monitoring the displacement of the second pair of proof masses, and a third voltage value reflecting the motion occurring in the third direction by subtracting the sum of the output voltages of the piezoelectric gauges of the first pair of piezoelectric gauges monitoring the displacement of the first pair of proof masses to the sum of the output voltages of the piezoelectric gauges of the second pair of piezoelectric gauges monitoring the displacement of the second pair of proof masses.

The differential excitation of the first and the second pairs of proof masses and the use of piezoelectric gauges make it possible to achieve a resource-efficient readout of the angular displacements occurring in all three directions.

A second object of the present invention relates to a method for determining values reflecting the rotational movement occurring in a first direction, a second direction and a third direction perpendicular to each other through an inertial sensor according to any of the embodiments described above. This method comprises subtracting the output voltages of the piezoelectric gauges of the first pair of piezoelectric gauges monitoring the displacement of the first pair of proof masses, subtracting the output voltages of the piezoelectric gauges of the second pair of piezoelectric gauges monitoring the displacement of the second pair of proof masses and subtracting the sum of the output voltages of the piezoelectric gauges of the first pair of piezoelectric gauges monitoring the displacement of the first pair of proof masses from the sum of the output voltages of the piezoelectric gauges of the second pair of piezoelectric gauges monitoring the displacement of the second pair of proof masses. These steps are performed by a computing system comprised in the inertial sensor.

A third object of the present invention relates to a computer program comprising instruction sets for implementing, when executed by a processor, the aforementioned method.

BRIEF DESCRIPTION OF THE FIGURES

The foregoing and other aspects of the embodiments of this invention are made more evident in the following Detailed Description, when read in conjunction with the attached Drawing Figures, wherein.

The figures are given as example and are not restrictive to the invention. They are guideline schematic representations designed to facilitate the understanding of the invention and they are not necessarily at the scale of practical implementations.

DETAILED DESCRIPTION

Before performing a detailed review of the different embodiments of the present invention, here are stated the optional characteristics that can eventually be implemented, in association or alternatively.

According to an embodiment, the inertial sensor comprises an additional first pair of piezoelectric gauges monitoring the displacement of the first pair of proof masses and being symmetrical to the first pair of piezoelectric gauges around the X axis, and an additional second pair of piezoelectric gauges monitoring the displacement of second pair of proof masses and being symmetrical to the second pair of piezoelectric gauges around the Y axis.

According to an embodiment, the excitation device comprises a set of shuttles with embedded push-pull drive electrodes.

According to an embodiment, the shuttles are connected to each other so that exciting one of them sets all the others in motion.

According to an embodiment, the shuttles comprise a first shuttle configured to excite both the first proof mass of the first pair of proof masses and the first proof mass of the second pair of proof masses, a second shuttle configured to excite both the first proof mass of the first pair of proof masses and the second proof mass of the second pair of proof masses, a third shuttle configured to excite both the second proof mass of the second pair of proof masses and the second proof mass of the first pair of proof masses, a fourth shuttle configured to excite both the first proof mass of the second pair of proof masses and the second proof mass of the first pair of proof masses.

According to an embodiment, the inertial sensor comprises two piezoelectric gauges monitoring the motion of two adjacent shuttles among the first shuttle, the second shuttle, the third shuttle and the fourth shuttle.

According to an embodiment, the first shuttle, the second shuttle, the third shuttle and the fourth shuttle are symmetrical by rotation of 90° around the third direction.

According to an embodiment, the first proof mass of the first pair of proof masses, the second proof mass of the first pair of proof masses, the first proof mass of the second pair of proof masses and the second proof mass of the second pair of proof masses are identical.

According to an embodiment, also the drive motion is sensed through resistive gauges.

According to an embodiment, the inertial sensor includes dummy gauges on chip to form a piezoresistive bridge.

According to an embodiment, the sensing system is square-shaped.

According to an embodiment, the first proof mass of the first pair of proof masses, the second proof mass of the first pair of proof masses, the first proof mass of the second pair of proof masses and the second proof mass of the second pair of proof masses are connected to the first, second, third and fourth frame respectively through springs.

Unless otherwise indicated in the context of the present application, the terms "thickness" and "depth" refer to dimensions oriented along the thickness of the substrate.

Terms like "on", "underlying", "positioned on", or "above" or the equivalents thereof do not necessarily mean a direct contact, but, a priori, any position where staking is effective. This includes the presence of interlayers between the superimposed parts.

The following detailed description of the invention refers to the accompanying drawings. While the description includes exemplary embodiments, other embodiments are possible, and changes may be made to the embodiments described without departing from the spirit and scope of the invention.

Some advantageous features will be described below. Then some exemplary embodiments and use cases will be further detailed in regard with the drawings.

FIGS. 4 to 8 show a schematic view of an inertial sensor according to the present invention. This device is designed to sense the Coriolis acceleration occurring in three directions perpendicular to each other. These three directions correspond to the three axis of the orthogonal coordinate system XYZ illustrated in FIG. 5. This sensor shall now be described.

The sensor according to the present invention comprises a substrate which defines a device plane extending along a first direction and a second direction, referred as X and Y in the orthogonal mark represented in FIGS. 4 to 8. The device plane is perpendicular to a third direction referred as Z in the same orthogonal mark. The sensor comprises a first pair of proof masses 10, a second pair of proof masses 20, an excitation device 30, a first frame 41, a second frame 42, a third frame 43, a fourth frame 44, a rotatable frame 40 and a sensing system 50.

According to one aspect, the first proof mass of the first pair of proof masses 10, the second proof mass of the first pair of proof masses 10, the first proof mass of the second pair of proof masses 20 and the second proof mass of the second pair of proof masses 20 are identical. This makes the structure more symmetrical and therefore more robust to external vibrations and shocks.

For the same purpose, the sensing system is preferably square-shaped.

Advantageously, the first proof mass 11 of the first pair of proof masses 10, the second proof mass 12 of the first pair of proof masses 10, the first proof mass 21 of the second pair of proof masses 20 and the second proof mass 22 of the second pair of proof masses 20 are connected to the first, second, third and fourth frame 41,42,43,44 respectively through springs.

Preferably, the excitation device 30 is a set of shuttles with embedded push-pull drive electrodes, and more specifically comb finger electrodes. Comb finger electrodes actuators are common knowledge in microelectronics. It makes use of tangential electrostatic forces for driving. Such actuators are actually consisting in comb-finger stators and comb-finger rotors. Comb-finger stators are not shown in the figures for sake of clarity.

Advantageously, the shuttles are connected to each other so that exciting one of them sets all the other in motion. This is an energy-efficient architecture that also guarantees the synchronicity of the motion of the proof masses of the first and the second pair of proof masses.

Figure 4:
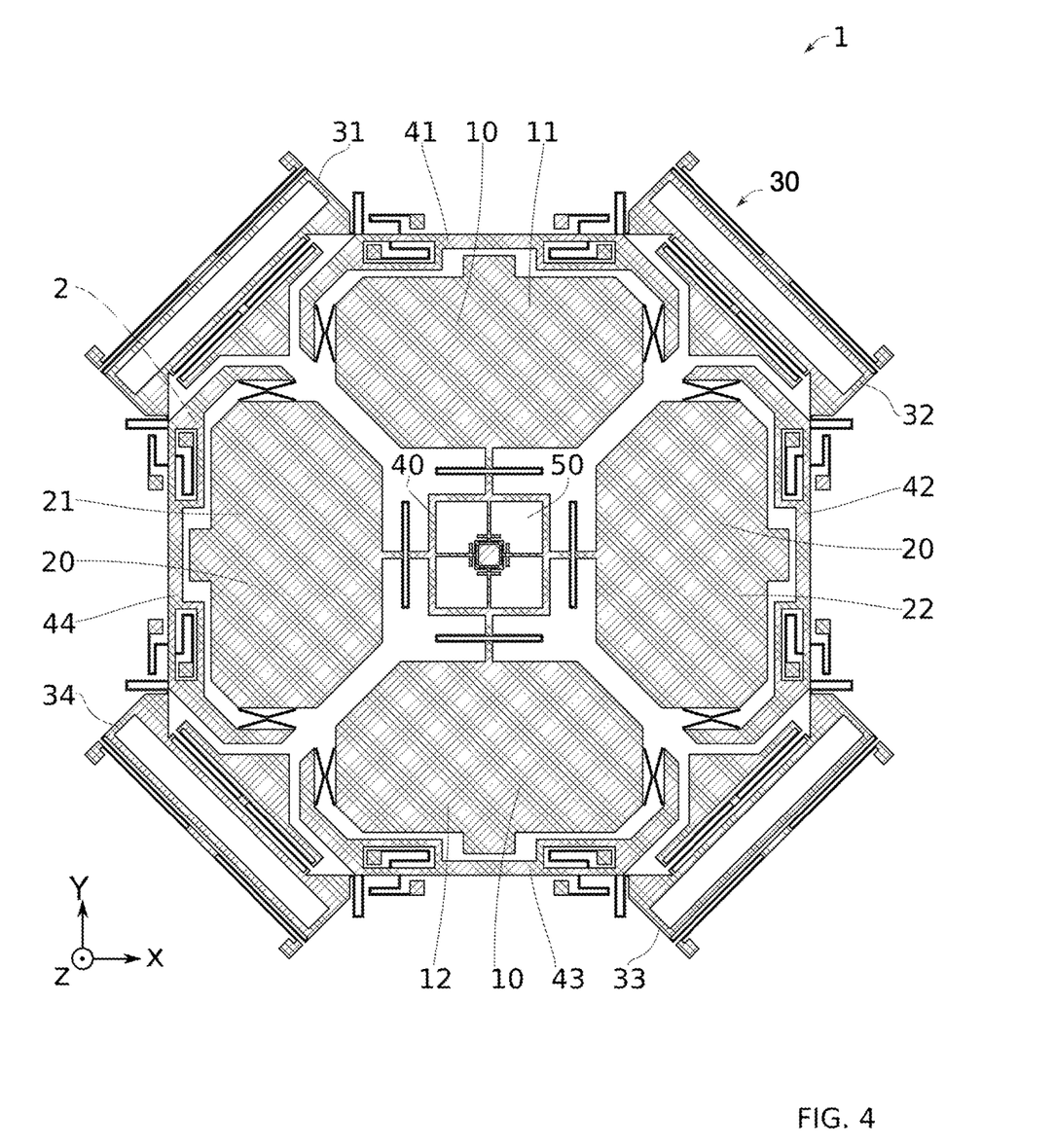
FIG. 4 is a top view of a 3-axis inertial sensor according to the invention.
Figure 7:
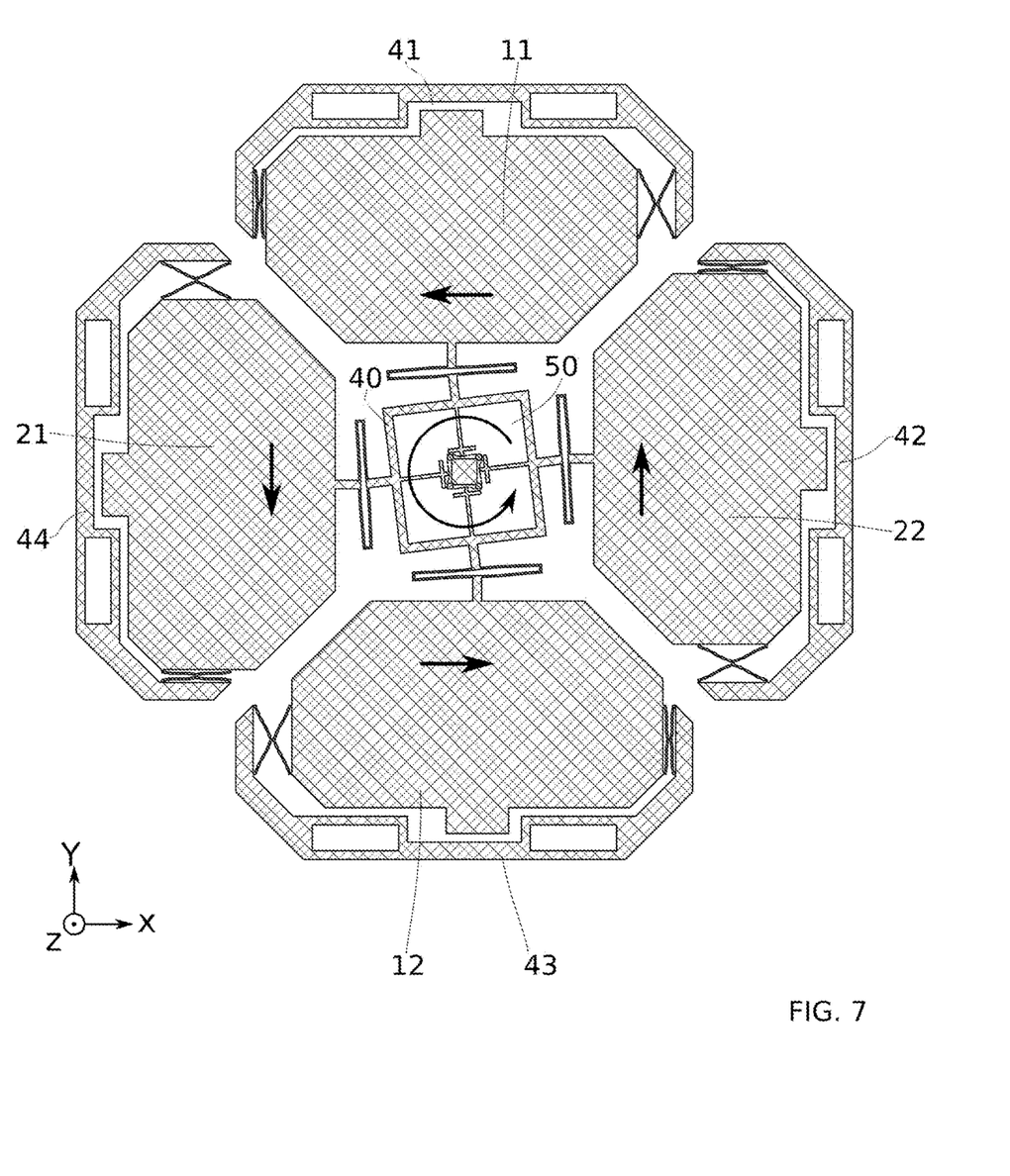
FIG. 7 depicts a 3-axis inertial sensor gyroscope according to the invention sensing the Coriolis acceleration occurring in the Z direction.

Preferably, as illustrated in FIG. 4, the sensor comprises a first shuttle 31, a second shuttle 32, a third shuttle 33 and a fourth shuttle 34 arranged so that each shuttle simultaneously excites two proof masses disposed adjacent to each other. Advantageously, each shuttle 31, 32, 33 or 34 is configured to simultaneously excite a different couple composed of two proof masses among the proof masses of the first pair of proof masses 10 and the second pair of proof masses 20. This is a power-efficient design that makes it possible to set the first pair of proof masses 10 and the second pair of proof masses 20 into a synchronous motion, as depicted in FIG. 7, especially when combined with the preceding embodiment.

Preferably, the first shuttle 31, the second shuttle 32, the third shuttle 33 and the fourth shuttle 34 are symmetrical by rotation of 90° around the third direction.

The excitation device 30 is configured to force the first pair of proof masses 10 and the second pair of proof masses 20 into a motion going towards and away from the sensing system 50. More precisely, the excitation device is configured so that the first proof mass 11, 21 and the second proof mass 12, 22 of each pair of proof masses 10, 20 keep moving in opposite direction continuously and with the same velocity during operation of the sensor 1. Preferably, the proof masses 11, 12 of the first pair of proof masses 10 and the proof masses 21, 22 of the second pair of proof masses 20 are motioned towards the sensing system at the same time and away from the sensing system at the same time. The maximum displacement of the proof masses 11, 12, 21 and 22 is set to a fixed value. Preferably, the maximum displacement is set at 10 μm or more (1 μm=$10^{-6}$ m).

The sensing system 50 comprises at least a first pair of piezoelectric gauges 111, 112 monitoring the displacement of the first pair of proof masses 10 and at least a second pair of piezoelectric gauges 121, 122 monitoring the second pair of proof masses 20. Piezoelectric gauges are particularly advantageous compared to other readout means. Indeed, it allows to further reduce the area occupation and improve the noise (e.g. 100 μdps/√Hz) and the stability performance (e.g. 0.01-0.1°/hr) of the device.

Figure 6:
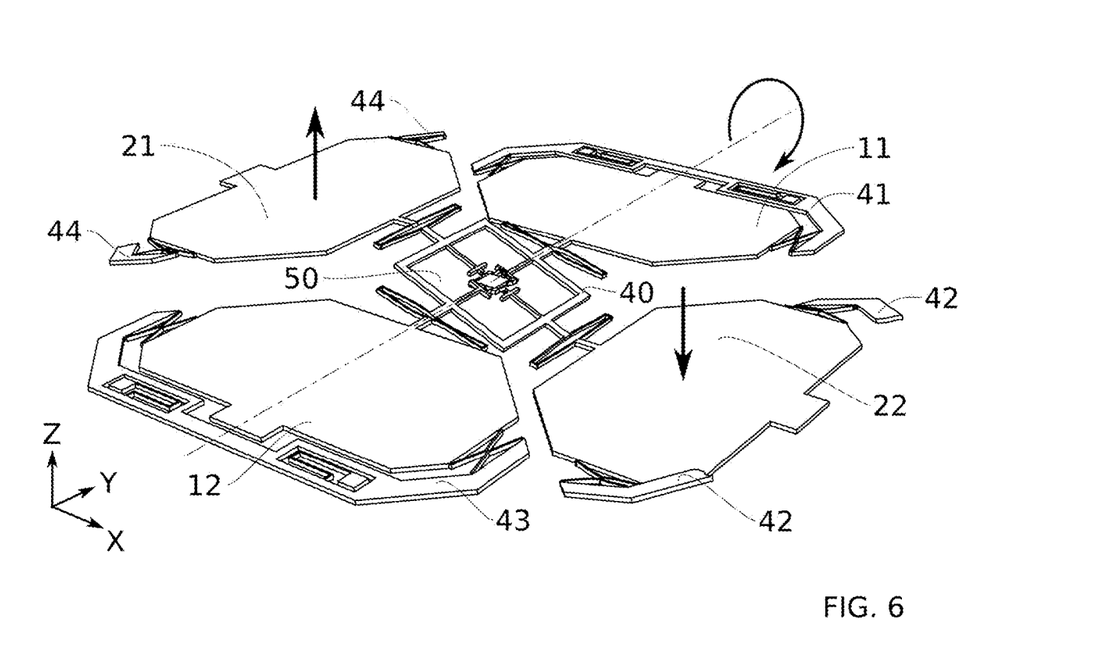

The effect of a rotation movement occurring around the X axis on the rotatable frame 40 will now be described. It is understood that the same explanation applies to a rotation movement occurring around the Y axis. This second case is illustrated in FIG. 6.

Figure 5:
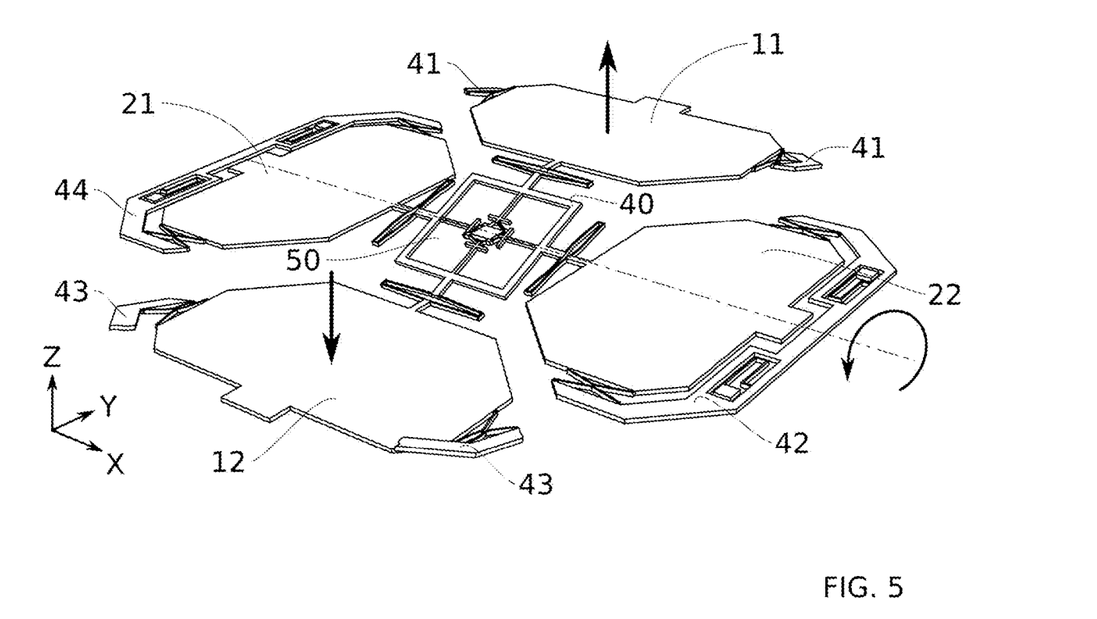
FIGS. 5 and 6 depict a 3-axis inertial sensor gyroscope according to the invention sensing the Coriolis acceleration occurring in the Y and X directions respectively.

When a rotation movement occurs around the X axis, each of the first proof mass 11 and the second proof mass 12 of the first pair of proof masses 10 experience a Coriolis force. These Coriolis forces are both directed along the Z direction but have opposite directions. These opposite forces applied to the first proof mass 11 and the second proof mass 12 of the first pair of proof masses 10 lead to opposite displacements of each of these proof masses as illustrated in FIG. 5. The first proof mass 11 and the second proof mass 12 of the first pair of proof masses 10 being connected to the rotatable frame 40 and the rotatable frame 40 being rotatable around the X axis, these opposite displacements lead to the rotatable frame 40 tilting around the X axis. This resulting tilting of the rotatable frame 40 is monitored by the sensing system 50 comprising piezoelectric gauges.

The effect of a rotation movement occurring around the Z axis on the rotatable frame 40 will now be described.

Figure 8:
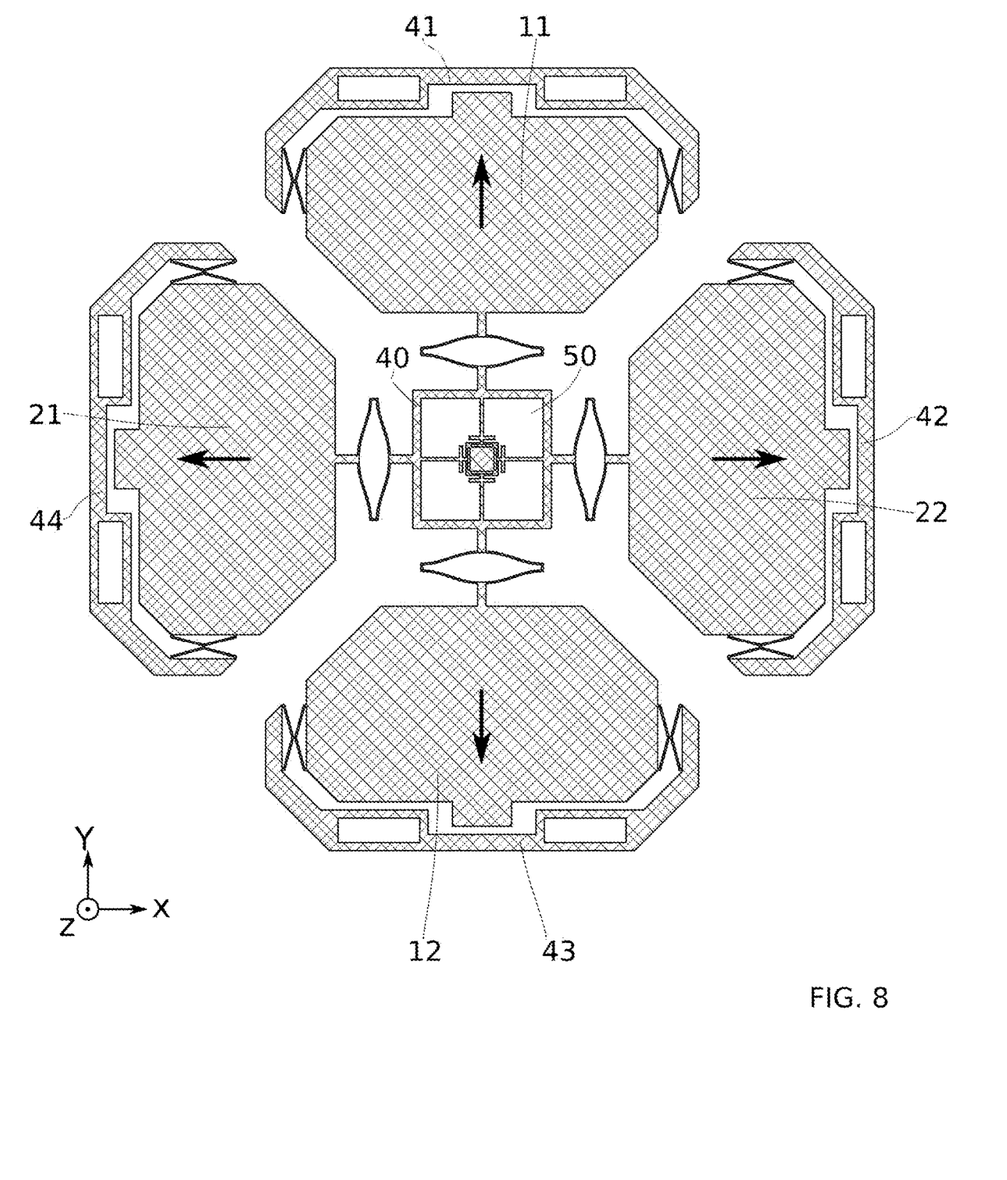
FIG. 8 depicts a 3-axis inertial sensor gyroscope according to the invention excited in its drive motion.

When a rotation movement occurs around the Z axis, each of the first proof mass 11 and the second proof mass 12 of the first pair of proof masses 10 as well as each of the first mass 21 and the second proof mass 22 of the second pair of proof masses 20 experience a Coriolis force. The two masses of the first pair of proof masses 10 are subjected to Coriolis forces that are both directed along the Y axis but have opposite directions, leading to opposite displacements as illustrated in FIG. 8. The two masses of the second pair of proof masses 20 are subjected to Coriolis forces that are both directed along the X axis but have opposite direction, leading to opposite displacements, which is also illustrated in FIG. 8. The resulting motion is a synchronous rotation of the four masses 11, 12, 21, 22 of the first and second pair of proof masses 10 and 20 in the same direction of rotation (clockwise or counter clockwise, depending on the sign of the angular rate along the Z axis). Each proof mass 11, 12, 21, 22 of each pair of proof masses 10, 20 being connected to the rotatable frame 40 and the rotatable frame 40 being rotatable around the Z axis, these opposite displacements lead to a tilting of the rotatable frame 40 around the Z axis. This tilting of the rotatable frame 40 is monitored by the sensing system.

The operation of the sensing system shall now be described.

Figure 9:
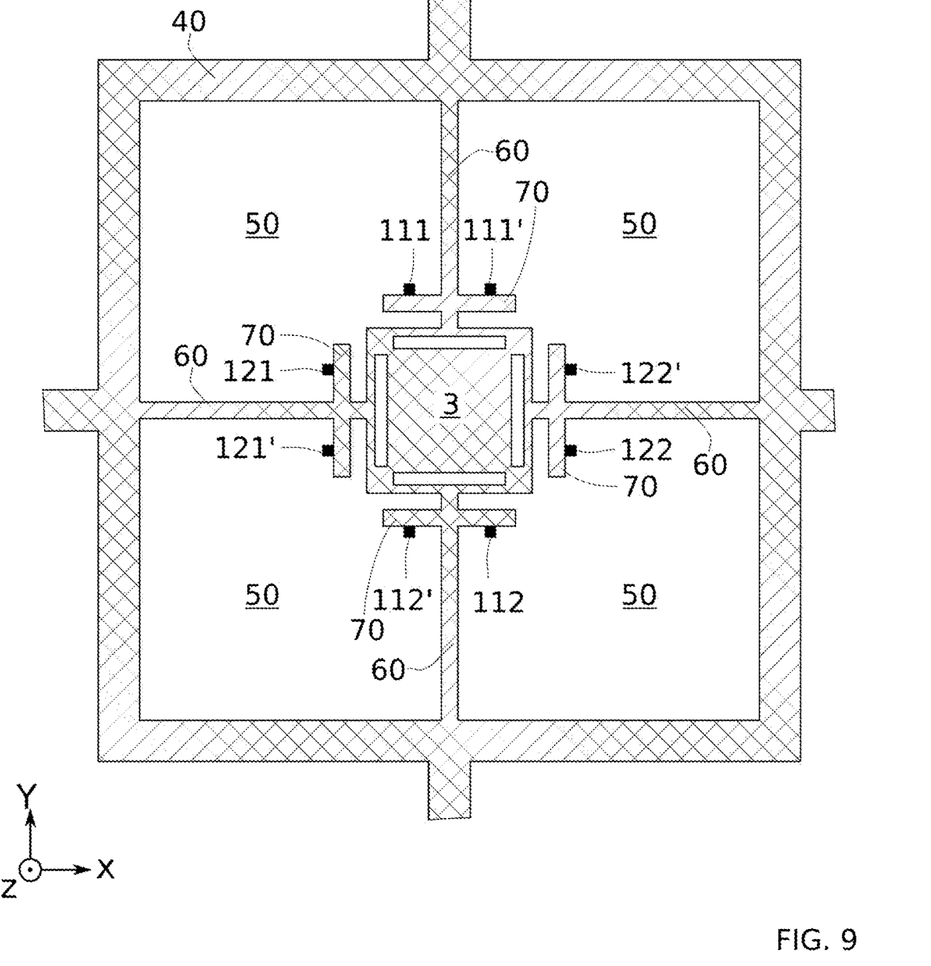
FIG. 9 is a schematic representation of the fixed sensing system.

The sensing system 50 comprises at least a first piezoelectric gauge that is positioned so that its output voltage reflects the tilting of the rotatable frame 40 around the X axis and the Z axis and at least a second piezoelectric gauge that is positioned so that its output voltage reflects the tilting of the rotatable frame 40 around the Y axis and the Z axis. Different architectures can be considered for the sensing system 50. One of them is depicted in FIG. 9. In this example, the sensing system also comprises a central anchor point 3 fixed to the substrate and four beams 60 perpendicularly extending from each side of the rotatable frame 40 to the anchor point 3. Each beam 60 is rotationally fixed to the corresponding side of the rotatable frame 40. Each beam 60 is also connected through a rotationally fixed connection to a rod 70 that extends perpendicularly to said beam 60. The rod 70 is therefore parallel to the side of the rotatable frame 40 to which the considered beam 60 is connected. The rod 70 and the beam 60 on the one hand, and the beam 60 and the side of the rotatable frame 40 on the other hand being rotationally fixed, when the side of the rotatable frame 40 tilts of a certain angle, the rod 70 tilts through the same angle. For the same reason, when the side of the rotatable frame 40 pivots around the Z axis through a certain angle, the rod 70 pivots through the same angle. This applies to each beam 60.

At least a first pair of piezoelectric gauges 111, 112 monitors the displacement of the first pair of proof masses 10. To this end, the piezoelectric gauges 111, 112 of this first pair are connected to two different rods 70 that are connected to sides of the rotatable frame 40 facing each other and parallel to the Y axis. More specifically, the piezoelectric gauges 111, 112 of this first pair are situated at positions symmetrical to each other around the Z axis.

It is understood that a similar detection system, involving a second pair of piezoelectric gauges 121, 122 connected to the other two rods, is set up so as to monitor the displacement of the second pair of proof masses 20.

The deformation of each piezoelectric gauge 111, 112, 121, 122 of each pair of piezoelectric gauges is proportional to an output voltage. The different output voltages are referred as follows:

the output voltage of the first piezoelectrical gauge 111 of the first pair of piezoelectrical gauges is called $V_A$, the output voltage of the first piezoelectrical gauge 121 of the second pair of piezoelectrical gauges is called $V_B$, the output voltage of the second piezoelectrical gauge 112 of the first pair of piezoelectrical gauges is called $V_C$, the output voltage of the second piezoelectrical gauge 122 of the second pair of piezoelectrical gauges is called $V_D$.

Figure 10:
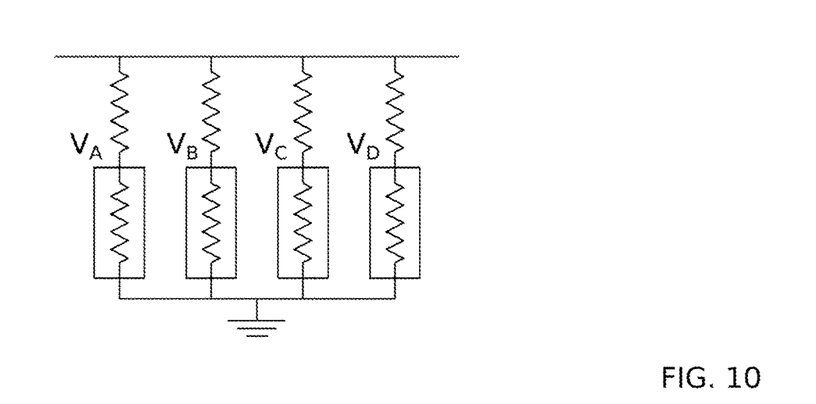
FIG. 10 is a schematic representation of the electrical circuit equivalent to the fixed sensing system.

An electrical circuit equivalent to the fixed sensing system is represented in FIG. 10. The piezoelectric gauges 111, 121, 112, 122 can be assimilated to resistors in parallel since they are all mechanically associated to both the rotatable frame 40 and the anchor point 3.

The displacements $\Delta x$, $\Delta y$ and $\Delta z$ relative to the tilting of the rods 70 and therefore to the tilting of the rotatable frame 40, the first pair of proof masses 10 and the second pair of proof masses 20, can be calculated by a computing system as follows:

$$f(V_C - V_A) = x_2 - x_1 = 2\Delta x$$

$$f(V_D - V_B) = y_2 - y_1 = 2\Delta y$$

$$f(V_A - V_B + V_C - V_D) = 2z_2 - 2z_1 = 4\Delta z$$

$x_1$, $x_2$, $y_1$, $y_2$, $z_1$ and $z_2$ being the coordinates in the XYZ mark of the connection points between the piezoelectric gauges and the rods 70.

The computation can be in the form of analog electronic stages, or digital stages (microcontrollers, field-programmable gate arrays—commonly known as FPGAs . . . ).

The computing system is preferably nested in the sensing system 50.

Thanks to the differential movement of the first pair of proof masses 10 and the second pair of proof masses 20, only four piezoelectric gauges are needed to measure the rotational movements occurring around all three axes. This significantly reduces the required biasing current and thus the overall power consumption, as evident to the expert in the field. The sensor can comprise four more piezoelectric gauges so as to monitor the driving of the first pair of proof masses 10 and the second pair of proof masses 20, resulting in a total of eight piezoelectric gauges needed, in order to increase the system performance by increasing the number of sensing elements. In an even lower power approach, only two piezoelectric gauges can be used to monitor the drive modes, resulting in a total of six gauges. In contrast, usual solutions for piezoelectric detection in inertial sensors would require twelve piezoelectric gauges (six for measuring the tilting of the detection proof masses, and six for monitoring the driving modes). The present invention therefore makes it possible to achieve a 2-fold reduction in the number of needed piezoelectric gauges and hence in the current consumption.

Advantageously, the sensing system 50 comprises an additional first pair of piezoelectric gauges 111', 112' monitoring the displacement of the first pair of proof masses 10 and at least an additional second pair of piezoelectric gauges 121', 122' monitoring the second pair of proof masses 20. In this embodiment, the additional first pair of piezoelectric gauges 111', 112' is symmetrical to the first pair of piezoelectric gauges 111, 112 around the X axis, and the additional second pair of piezoelectric gauges 121', 122' is symmetrical to the second pair of piezoelectric gauges 121, 122 around the X axis. The first additional pair of piezoelectric gauges 111', 112' and the second additional pair of piezoelectric gauges 121', 122' operates differentially relatively to the first pair of piezoelectric gauges 111, 112 and the second pair of piezoelectric gauges 121, 122 respectively. Monitoring each rod 70 at two points symmetrical about the center of said rod 70 makes it possible to double the amplitude of the output signal relative to the tilting of said 70.

The improvements brought by the invention in terms of noise level shall now be described.

Four main modes can be identified in the structure:

A first mode, called pitch mode, related to the out-of-plane displacement of the first pair of proof masses (10), A second mode, called roll mode, related to the out-of-plane displacement of the second pair of proof masses (10), A third mode, called yaw mode, related to the in-plane displacement of both the first and the second pairs of proof masses (10), (20), A fourth mode, called drive mode, related to the in-plane excitation of both the first and the second pairs of proof masses (10), (20).

All four modes resonate around a given frequency called sense frequency $f_s$. For example, they resonate around 20 kHz. The pitch mode and the roll mode have a certain mismatch $\Delta f$ from the drive mode, for example a mismatch of +300 Hz and −300 Hz respectively, while the yaw mode have another mismatch from the drive mode, for example a mismatch of 600 Hz.

The achievable noise is given by:

$$\Omega_{n,tot} = \sqrt{\Omega_{n,TM}^2 + \Omega_{n,res}^2 + \Omega_{n,INA}^2}$$

$$= \frac{1}{x_d} \frac{180°}{\pi} \sqrt{\frac{k_B T}{2\omega_s m_s} \frac{1}{Q_s} + \left(\frac{\Delta\omega}{\frac{V_{br}}{2} \frac{GF \times \Gamma}{L_{ng}}}\right)^2 (\sigma_R^2 + \sigma_{INA}^2)}$$

$m_s$ being a proof mass' mass, $Q_s$ either the pitch/roll quality factor $Q_{sp}$ or the yaw quality factor $Q_{sy}$, GF the gauge factor, $L_{ng}$ the gauge length, $\Gamma_s$ either the pitch/roll de-amplification factor $\Gamma_{sp}$ or the yaw de-amplification factor $\Gamma_{sy}$, $\sigma_{INA}^2$ the electronic noise and $\sigma_R^2$ the gauge noise.

The parameters can take the following values:

| Parameter | Value |
|---|---|
| $\omega_s = 2\pi f_s$ | $2\pi 20000$ Hz |
| $\Delta\omega = 2\pi\Delta f$ | $2\pi 300$ Hz |
| $m_s$ | 21 nKg |
| $Q_{sy}$ | 15000 |
| $Q_{sp}$ | 5000 |
| $R_{ng}$ | 2400 Ω |
| $V_{br}$ | $2i_{ng}R_{ng}$ |
| GF | 50 |
| $L_{ng}$ | 5 μm |
| $\Gamma_{sy}$ | 0.01 |
| $\Gamma_{sp}$ | 0.0064 |
| $\sigma_{INA}^2$ | $(3\ nV/\sqrt{Hz})^2$ |
| $\sigma_R^2$ | $(6.4\ nV/\sqrt{Hz})^2$ |

With the numerical values given as examples, and a current of 100 μA (1 μA=$10^{-6}$ A), a noise level of around 0.5 mdps/$\sqrt{Hz}$. (mdps standing for millidegree per second) for each axis can be achieved, mainly dominated by the Johnson noise of the gauge itself.

With this configuration, increasing the current directly lowers noise and values down to 100 μdps/$\sqrt{Hz}$ could be achieved. This is difficult to obtain with capacitive solutions, unless very large biasing voltages (e.g. 50 V to 100 V) are used.

It is clear through the different embodiments described above that the invention can provide a new 3-axis inertial sensor with low-noise and high-stability levels as well as a space-saving architecture. In particular, the architecture described in the present invention makes it possible to realise an in-plane measurement of the angular movement occurring around the Z axis.

Another aspect of the invention relates to a method for determining values reflecting the rotational movement occurring in a first direction, second direction and third direction perpendicular to each other through an inertial sensor according to any embodiment described above. The method comprises the following steps:

Subtracting the output voltages of the piezoelectric gauges of the first pair of piezoelectric gauges monitoring the displacement of the first pair of proof masses 10, Subtracting the output voltages of the piezoelectric gauges of the second pair of piezoelectric gauges monitoring the displacement of the second pair of proof masses 20, Subtracting the sum of the output voltages of the piezoelectric gauges of the first pair of piezoelectric gauges monitoring the displacement of the first pair of proof masses 10 from the sum of the output voltages of the piezoelectric gauges of the second pair of piezoelectric gauges monitoring the displacement of the second pair of proof masses 20.

These steps are being performed by a computing system comprised in the inertial sensor 1. Preferably, the computing system is nested in the sensing system 50.

Another aspect of the invention relates to a computer program comprising instruction sets for implementing the method according to the preceding claim.

These instruction sets can be communicated to a processor, preferably a microprocessor or central processing unit (CPU), of a data processing apparatus, so that the instruction sets create means for executing the steps described above. These instruction sets may also be stored in a computer-readable medium, so that the computer-readable medium in which the information sets are stored constitute a device comprising instructions for executing the steps described above.

The invention claimed is:

1. An inertial sensor comprising:
    a substrate which defines a device plane extending along a first direction and a second direction, the device plane being perpendicular to a third direction,
    a first pair of proof masses sensitive to rotation movements occurring around the first direction and the third direction,
    a second pair of proof masses sensitive to rotation movements occurring around the second direction and the third direction,
    an excitation device,
    a first frame, a second frame, a third frame and a fourth frame,
    a rotatable frame rotatable around the first direction, the second direction and the third direction, and
    a sensing system connected to the rotatable frame,
    wherein:
        the excitation device is configured to force both of the first pair of proof masses and the second pair of proof masses into a motion going towards and away from the sensing system,
        the sensing system comprises at least a first pair of piezoelectric gauges monitoring the displacement of the first pair of proof masses and at least a second pair of piezoelectric gauges monitoring the displacement of the second pair of proof masses, and
        the sensing system is configured to read out:
            a first voltage value reflecting the motion occurring in the first direction by subtracting from each other the output voltages of the piezoelectric gauges of the first pair of piezoelectric gauges monitoring the displacement of the first pair of proof masses,
            a second voltage value reflecting the motion occurring in the second direction by subtracting from each other the output voltages of the piezoelectric gauges of the second pair of piezoelectric gauges monitoring the displacement of the second pair of proof masses, and
            a third voltage value reflecting the motion occurring in the third direction by subtracting the sum of the output voltages of the piezoelectric gauges of the first pair of piezoelectric gauges monitoring the displacement of the first pair of proof masses from the sum of the output voltages of the piezoelectric gauges of the second pair of piezoelectric gauges monitoring the displacement of the second pair of proof masses.

2. The sensor according to claim 1, comprising an additional first pair of piezoelectric gauges monitoring the displacement of the first pair of proof masses and being arranged symmetrical to the first pair of piezoelectric gauges around the X axis, and an additional second pair of piezoelectric gauges monitoring the displacement of second pair of proof masses and being arranged symmetrical to the second pair of piezoelectric gauges around the Y axis.

3. The sensor according to claim 1, wherein the excitation device comprises a set of shuttles with embedded push-pull drive electrodes.

4. The sensor according to claim 3, wherein the shuttles are connected to each other so that exciting one of them sets all the others in motion.

5. The sensor according to claim 3, wherein the set of shuttles comprises:

a first shuttle configured to excite both a first proof mass of the first pair of proof masses and a first proof mass of the second pair of proof masses, a second shuttle configured to excite both the first proof mass of the first pair of proof masses and a second proof mass of the second pair of proof masses, a third shuttle configured to excite both the second proof mass of the second pair of proof masses and a second proof mass of the first pair of proof masses, and a fourth shuttle configured to excite both the first proof mass of the second pair of proof masses and the second proof mass of the first pair of proof masses.

6. The sensor according to claim 5, comprising two piezoelectrical gauges, different from the first and second pairs of piezoelectric gauges, monitoring motion of two adjacent shuttles among the first shuttle, the second shuttle, the third shuttle and the fourth shuttle.

7. The sensor according to claim 5, wherein the first shuttle, the second shuttle, the third shuttle and the fourth shuttle are arranged symmetrically by rotation of 90° around the third direction.

8. The sensor according to claim 1, wherein a first proof mass of the first pair of proof masses, a second proof mass of the first pair of proof masses, a first proof mass of the second pair of proof masses and a second proof mass of the second pair of proof masses are identical.

9. The sensor according to claim 1, wherein the sensing system is square-shaped.

10. The sensor according to claim 1, wherein a first proof mass of the first pair of proof masses, a second proof mass of the first pair of proof masses, a first proof mass of the second pair of proof masses and a second proof mass of the second pair of proof masses are connected to the first, second, third and fourth frame respectively through springs.

11. A method for determining values reflecting the rotational movement occurring in a first direction, a second direction and a third direction perpendicular to each other through an inertial sensor according to claim 1, comprising the following steps being performed by a computing system comprised in said inertial sensor:

subtracting from each other the output voltages of the piezoelectric gauges of the first pair of piezoelectric gauges monitoring the displacement of the first pair of proof masses, subtracting from each other the output voltages of the piezoelectric gauges of the second pair of piezoelectric gauges monitoring the displacement of the second pair of proof masses, and subtracting the sum of the output voltages of the piezoelectric gauges of the first pair of piezoelectric gauges monitoring the displacement of the first pair of proof masses from the sum of the output voltages of the piezoelectric gauges of the second pair of piezoelectric gauges monitoring the displacement of the second pair of proof masses.

12. A computer program comprising instruction sets for implementing, when executed by a processor, the method according to claim 11.

* * * * *